(12) United States Patent
Nakata et al.

(10) Patent No.: US 11,984,827 B2
(45) Date of Patent: May 14, 2024

(54) MOTOR CONTROL APPARATUS, MOTOR, COMPRESSOR, REFRIGERATION APPARATUS AND VEHICLE

(71) Applicant: DAIKIN INDUSTRIES, LTD., Osaka (JP)

(72) Inventors: Tomoki Nakata, Osaka (JP); Takayuki Miyajima, Osaka (JP); Nobuo Hayashi, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 18/548,136

(22) PCT Filed: Mar. 25, 2022

(86) PCT No.: PCT/JP2022/014590
§ 371 (c)(1),
(2) Date: Aug. 28, 2023

(87) PCT Pub. No.: WO2022/210404
PCT Pub. Date: Oct. 6, 2022

(65) Prior Publication Data
US 2024/0039439 A1 Feb. 1, 2024

(30) Foreign Application Priority Data
Mar. 31, 2021 (JP) .................. 2021-059252

(51) Int. Cl.
*H02P 21/05* (2006.01)
*B60L 50/51* (2019.01)
(Continued)

(52) U.S. Cl.
CPC ............ *H02P 21/05* (2013.01); *B60L 50/51* (2019.02); *F25B 31/02* (2013.01); *H02P 21/22* (2016.02);
(Continued)

(58) Field of Classification Search
CPC .......... H02P 21/05; H02P 21/22; H02P 27/06; H02P 27/12; B60L 50/51; F25B 31/02
See application file for complete search history.

(56) References Cited

U.S. PATENT DOCUMENTS 5,481,451 A * 1/1996 Kuwahara ............. H02M 5/458
363/41
9,150,117 B2 * 10/2015 Itou ........................ B60L 15/20
(Continued)

FOREIGN PATENT DOCUMENTS

JP 2003-284387 10/2003
JP 2010-088228 4/2010
(Continued)

OTHER PUBLICATIONS

International Preliminary Report on Patentability for PCT/JP2022/014590 mailed on Oct. 12, 2023.
(Continued)

*Primary Examiner* — Thai T Dinh
(74) *Attorney, Agent, or Firm* — IPUSA, PLLC

(57) ABSTRACT

A motor control apparatus configured to convert an input power supplied from a power supply to an output alternating-current power having a predetermined voltage and a predetermined frequency is provided. The motor control apparatus includes an inverter circuit configured to supply the output alternating-current power to a motor, and is configured to perform a control to suppress an amplitude of a first harmonic component that occurs synchronously with a rotation rate of the motor in a power input into the motor to be lower than or equal to a predetermined value and to suppress an amplitude of a second harmonic component that occurs in an electromagnetic exciting force of the motor at a same frequency as the first harmonic component to be lower than the amplitude of the second harmonic component in a case of the amplitude of the first harmonic component being suppressed to a minimum.

15 Claims, 13 Drawing Sheets

(51) Int. Cl.
  *F25B 31/02* (2006.01)
  *H02P 21/22* (2016.01)
  *H02P 27/06* (2006.01)
  *H02P 27/12* (2006.01)
  *B60K 1/00* (2006.01)

(52) U.S. Cl.
  CPC ............... *H02P 27/12* (2013.01); *B60K 1/00* (2013.01); *H02P 2207/05* (2013.01); *H02P 2207/055* (2013.01)

(56) References Cited

U.S. PATENT DOCUMENTS

| | | | |
|---|---|---|---|
| 10,693,410 B2* | 6/2020 | Yoshida | H02P 23/04 |
| 2014/0049198 A1* | 2/2014 | Ooyama | H02M 1/12 |
| | | | 318/400.09 |
| 2015/0127202 A1* | 5/2015 | Itou | B60L 15/20 |
| | | | 701/22 |
| 2020/0119678 A1 | 4/2020 | Hoshino et al. | |

FOREIGN PATENT DOCUMENTS

| | | | |
|---|---|---|---|
| JP | 2016-005348 | | 1/2016 |
| JP | 2016005348 A | * | 1/2016 |
| JP | 2019-115114 | | 7/2019 |
| JP | 2020-188555 | | 11/2020 |
| WO | 2018/139295 | | 8/2018 |

OTHER PUBLICATIONS

International Search Report for PCT/JP2022/014590 mailed on May 17, 2022.

* cited by examiner

MOTOR CONTROL APPARATUS, MOTOR, COMPRESSOR, REFRIGERATION APPARATUS AND VEHICLE

TECHNICAL FIELD

The present disclosure relates to a motor control apparatus, a motor, a compressor, a refrigeration apparatus and a vehicle.

BACKGROUND ART

A known motor drive control apparatus is configured to convert a direct-current power supply having a constant direct-current voltage to a desirably selected pseudo three-phase alternating current by means of a three-phase bridge circuit, and drive a three-phase motor including a permanent magnet in the rotor. This motor drive control apparatus aims for reducing torque ripple on the motor by detecting an average value of the current at a direct-current portion of the three-phase bridge circuit, and controlling a desired current value of a rotation system such that a component having a frequency that is six times higher than the current frequency of the three-phase motor is reduced from the detected average value (for example, see PTL 1).

CITATION LIST

Patent Literature

[PTL 1] Japanese Patent Application Publication No. 2010-88228

SUMMARY OF INVENTION

Technical Problem

If a harmonic component is contained in a voltage induced in the motor, a harmonic component also occurs in a power that is input into the motor. Hence, a harmonic that is the same order as the harmonic component occurring in the power input into the motor may occur in a direct-current portion at an input side of an inverter circuit configured to supply the power to the motor.

However, even if a harmonic component that occurs in a power input into the motor is reduced, there may be a case where it is impossible to reduce a harmonic component, such as torque ripple, which occurs in an electromagnetic exciting force of the motor.

The present disclosure provides a motor control apparatus that can reduce a harmonic component that occurs in a power that is input into a motor, and a harmonic component that occurs in an electromagnetic exciting force of the motor, and a motor.

Solution to Problem

The present disclosure provides a motor control apparatus configured to convert an input power supplied from a power supply to an output alternating-current power having a predetermined voltage and a predetermined frequency, the motor control apparatus including:
an inverter circuit configured to supply the output alternating-current power to a motor,
wherein the motor control apparatus is configured to perform a control to suppress an amplitude of a first harmonic component that occurs synchronously with a rotation rate of the motor in a power input into the motor to be lower than or equal to a predetermined value and to suppress an amplitude of a second harmonic component that occurs in an electromagnetic exciting force of the motor at a same frequency as the first harmonic component to be lower than the amplitude of the second harmonic component in a case of the amplitude of the first harmonic component being suppressed to a minimum.

Hence, it is possible to reduce the harmonic component that occurs in the power input into the motor and the harmonic component that occurs in the electromagnetic exciting force of the motor.

In the motor control apparatus, the power supply may be an alternating-current power supply.

Hence, it is possible to reduce a harmonic that flows out into the alternating-current power supply.

In the motor control apparatus, a frequency of the first harmonic component and the second harmonic component may be a frequency that is a product of a fundamental frequency of a voltage input into the motor and a multiple of 6.

Hence, it is possible to reduce the harmonic components (the harmonic components having the frequency that is the product of the fundamental frequency of the voltage input into the motor and a multiple of 6) that occur in the power input into the motor and in the electromagnetic exciting force of the motor.

The motor control apparatus includes a control unit that is configured to perform the control.

The control unit may superimpose an amount of compensation that changes synchronously with the rotation rate of the motor on an amount of operation of the motor control apparatus.

Hence, it is possible to easily realize reduction in the harmonic component that occurs in the power input into the motor and the harmonic component that occurs in the electromagnetic exciting force of the motor.

In the motor control apparatus, the amount of operation may be at least one selected from a modulation rate of the inverter circuit, an amplitude of a voltage vector of the voltage input into the motor, a phase of the voltage vector, an amplitude of a current vector of a current input into the motor, and a phase of the current vector.

Hence, it is possible to more easily realize reduction in the harmonic component that occurs in the power input into the motor and the harmonic component that occurs in the electromagnetic exciting force of the motor.

In the motor control apparatus, the control unit may detect a value correlating with the first harmonic component, and determine either or both of an amplitude and a phase of the amount of compensation based on a relationship between the first harmonic component and the second harmonic component.

Hence, it is possible to easily realize reduction in the harmonic component that occurs in the power input into the motor and the harmonic component that occurs in the electromagnetic exciting force of the motor.

In the motor control apparatus, the control unit may detect a value correlating with the second harmonic component, and determine either or both of the amplitude and the phase of the amount of compensation based on a relationship between the first harmonic component and the second harmonic component.

Hence, it is possible to easily realize reduction in the harmonic component that occurs in the power input into the motor and the harmonic component that occurs in the electromagnetic exciting force of the motor.

The motor control apparatus may keep the relationship in the form of a table or a formula.

Hence, it is possible to easily realize reduction in the harmonic component that occurs in the power input into the motor and the harmonic component that occurs in the electromagnetic exciting force of the motor.

In the motor control apparatus, the control unit may detect a value correlating with the first harmonic component and a value correlating with the second harmonic value, and determine either or both of the amplitude and the phase of the amount of compensation.

Hence, it is possible to easily realize reduction in the harmonic component that occurs in the power input into the motor and the harmonic component that occurs in the electromagnetic exciting force of the motor.

In the motor control apparatus, the control unit may determine either or both of the amplitude and the phase of the amount of compensation based on the table or formula that is kept.

Hence, it is possible to easily realize reduction in the harmonic component that occurs in the power input into the motor and the harmonic component that occurs in the electromagnetic exciting force of the motor.

In the motor control apparatus, when the control is performed, a magnitude of variation of a component of energy stored in the motor having a same frequency as the first harmonic component may be lower than a magnitude of variation of a component of energy output through a torque of the motor having a same frequency as the second harmonic component.

Hence, it is possible to easily realize reduction in the harmonic component that occurs in the power input into the motor and the harmonic component that occurs in the electromagnetic exciting force of the motor.

The present disclosure provides a motor controlled by a motor control apparatus configured to suppress a first harmonic component that occurs synchronously with a rotation rate of the motor in a power input into the motor, or a second harmonic component that occurs in an electromagnetic exciting force of the motor at a same frequency as the first harmonic component, wherein when the suppression is performed in the motor, a magnitude of variation of a component of energy stored in the motor having a same frequency as the first harmonic component is lower than a magnitude of variation of a component of energy output through a torque of the motor having a same frequency as the second harmonic component.

Hence, it is possible to reduce the harmonic component that occurs in the power input into the motor and the harmonic component that occurs in the electromagnetic exciting force of the motor.

The motor may be a surface magnet synchronous motor including a rotor and a stator.

The rotor may include a rotor core and a plurality of magnets arranged in a circumferential direction of the rotor core.

Hence, it is possible to reduce the harmonic component that occurs in the power input into the motor and the harmonic component that occurs in the electromagnetic exciting force of the motor.

The motor may be an interior magnet synchronous motor including a rotor and a stator.

The rotor may include a rotor core and a plurality of magnets.

The rotor core may have a plurality of magnet insertion holes, and a magnetic resistance portion configured to suppress a main magnetic flux of the magnets.

Hence, it is possible to reduce the harmonic component that occurs in the power input into the motor and the harmonic component that occurs in the electromagnetic exciting force of the motor.

The present disclosure provides a compressor driven by the motor.

Hence, it is possible to provide a compressor that is mounted with a motor in which a harmonic component that occurs in a power input into the motor and a harmonic component that occurs in an electromagnetic exciting force of the motor can be reduced.

The present disclosure provides a refrigeration apparatus including the compressor.

Hence, it is possible to provide a refrigeration apparatus including a compressor that is mounted with a motor in which a harmonic component that occurs in a power input into the motor and a harmonic component that occurs in an electromagnetic exciting force of the motor can be reduced.

The present disclosure provides a vehicle mounted with the motor.

Hence, it is possible to provide a vehicle mounted with a motor in which a harmonic component that occurs in a power input into the motor and a harmonic component that occurs in an electromagnetic exciting force of the motor can be reduced.

DESCRIPTION OF EMBODIMENTS

Embodiments will be described below. First, a harmonic that occurs at an input side of an inverter circuit will be described.

Because a magnetomotive force and a gap permeance of a motor change in accordance with the rotation position of the motor, there may be a case where an interlinkage flux changes synchronously with the rotation rate of the motor and a voltage induced in the motor contains harmonic components such as components having frequencies that are five times or seven times higher than the fundamental frequency of the voltage. When the voltage induced in the motor contains such harmonic components, there may be a case where a harmonic component having a frequency that is the product of the fundamental frequency of the induced voltage and a multiple of 6 occurs in a power input into the motor.

For example, when a motor control apparatus such as a capacitor-less inverter that is free of an internal energy storage element is used, there may be a case where occurrence of a harmonic component in a power input into a motor likewise brings about occurrence of a harmonic, which has the same order as the harmonic component occurring in the power input into the motor, in the power at an input side of the inverter circuit. If this harmonic flows out into an alternating-current power supply that is present at the input side of the inverter circuit, a harmonic (power supply harmonic) having a frequency, which is the frequency of the power input into the motor±the frequency of the power supply voltage, is to be contained in the current at the power supply side. Hence, it is required to reduce the harmonic component in the power input into the motor such that each power supply harmonic that occurs due to the harmonic component in the power input into the motor becomes lower than or equal to a regulatory power supply harmonic value. Also when a power supply is a direct-current power supply such as a vehicle-mounted battery, a harmonic current having the frequency of a power input into a motor occurs at the input side. Because the harmonic current accelerates deterioration of the battery, it is required to reduce the harmonic in the power input into the motor as it is required for an alternating-current power supply.

Figure 1:
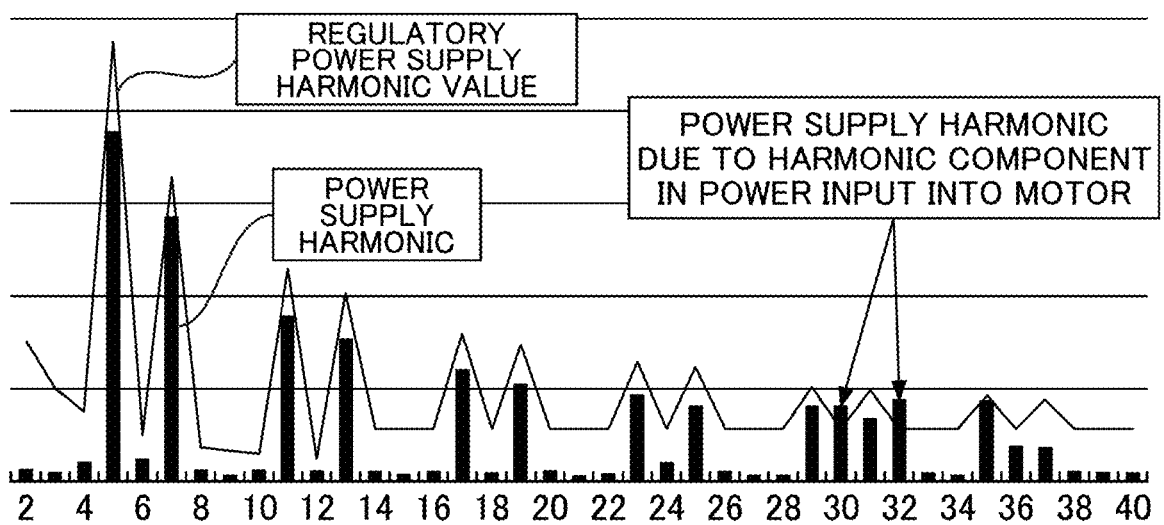
FIG. 1 is a graph illustrating a harmonic that occurs in a power supply current.

FIG. 1 is a graph illustrating a harmonic that occurs at an input side of a power converter circuit, and the horizontal axis represents the order of the harmonic (i.e., multiples of the frequency of a power supply voltage). FIG. 1 illustrates that $30^{th}$ and $32^{nd}$-order power supply harmonics are power supply harmonics due to a harmonic component that occurs in a power input into a motor, and that they exceed the regulatory power supply harmonic value. In this case, it is required to reduce the harmonic component in the power input into the motor such that the $30^{th}$ and $32^{nd}$-order power supply harmonics become lower than or equal to the regulatory power supply harmonic value.

Meanwhile, as described above, the technique of PTL 1 aims for reducing torque ripple on a motor by detecting an average value of the current at a direct-current portion of a three-phase bridge circuit, and controlling the current such that a component having a frequency that is six times higher than the current frequency of a three-phase motor is reduced from the detected average value.

Figure 2:
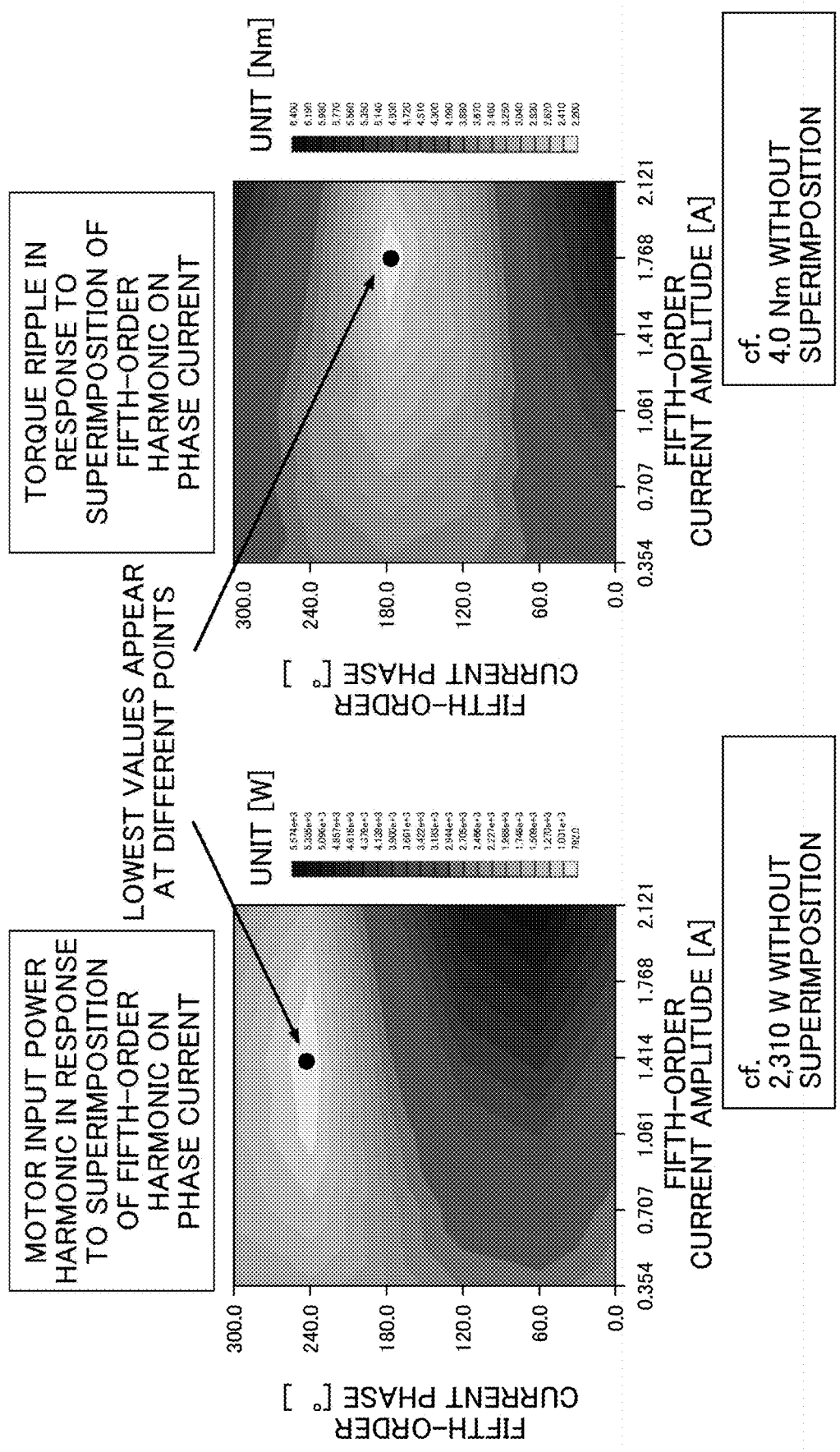
FIG. 2 is an example of a result of analyzing the magnitudes of a harmonic (motor input power harmonic) that occurs in a power input into a motor and of torque ripple on the motor when the amplitude and the phase of a fifth-order harmonic to be superimposed on a phase current of the motor are varied.

Here, a result illustrated in FIG. 2 was obtained when examining by magnetic field analysis as to whether both a harmonic occurring in a power input into a motor and torque ripple on the motor are reduced, when superimposing a waveform for harmonic compensation on a current. FIG. 2 is an example of the result of analyzing the magnitudes of the harmonic (motor input power harmonic) that occurred in the power input into the motor and of the torque ripple on the motor, with respect to varying of the amplitude and the phase of a fifth-order harmonic (corresponding to a sixth-order harmonic occurring in the power input into the motor) that was superimposed on a phase current of the motor.

As illustrated in FIG. 2, the obtained result indicates that the amplitude and the phase of the waveform of a current for compensation at which the motor input power harmonic became minimum were different from the amplitude and the phase of the waveform of a current for compensation at which the torque ripple became minimum. The obtained result also indicates that a fifth-order harmonic-superimposed current waveform that made the magnitude of the motor input power harmonic minimum made the magnitude of the torque ripple slightly higher than was made by a sinusoidal current on which no fifth-order harmonic was superimposed. As clear from this, there is a case where it is impossible to reduce the torque ripple on the motor by superimposition of a waveform for harmonic compensation that reduces the motor input power harmonic.

Figure 3:
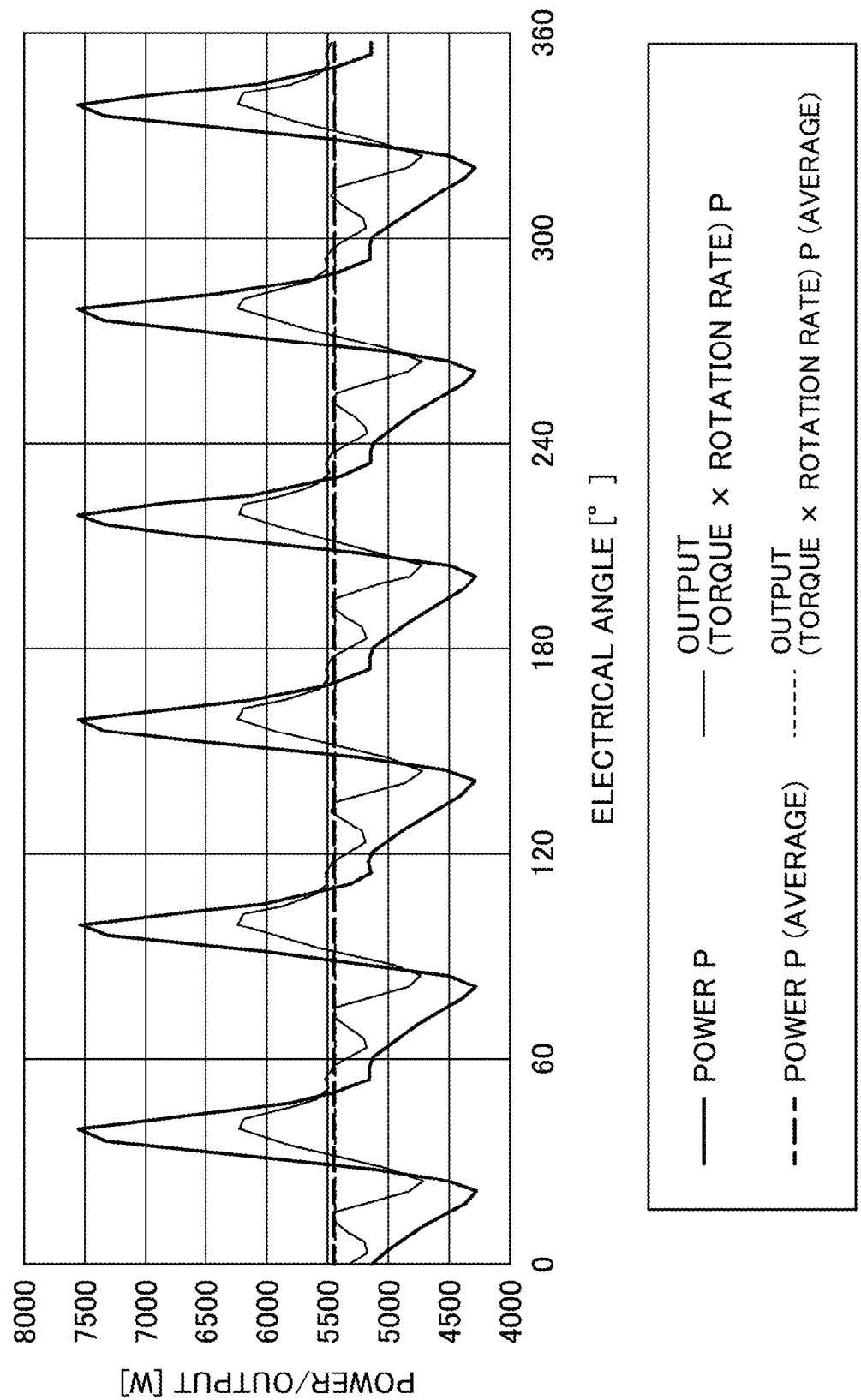
FIG. 3 is an example of a power and an output (=torque× rotation rate) of a motor derived by a magnetic field analysis with respect to an electrical angle of the motor.

Consideration will be given to this point. Provided that loss is ignored, it is considered that "power=torque×rotation rate" is satisfied in terms of an average power value. However, since the magnetic field analysis indicated that the waveform of the power supplied to the motor and the waveform of the output (=torque×rotation rate) of the motor did not match each other as illustrated in FIG. 3, it was found that "power=torque×rotation rate" is not satisfied in terms of an instantaneous power value. The reason for this is inferred to be instantaneous storage of energy in a coil of the motor. The energy instantaneously stored in a coil of the motor is referred to as stored energy of the motor.

FIG. 3 is an example of the power and the output (=torque×rotation rate) of the motor derived by the magnetic field analysis with respect to an electrical angle of the motor. In FIG. 3, loss is ignored. As illustrated in FIG. 3, the waveform of the power supplied to the motor and the waveform of the output of the motor match each other in terms of the average power value, but does not match each other in terms of the instantaneous power value. Hence, it is safe to say that reduction in the torque ripple on the motor is not always ensured by mere minimization of a motor input power harmonic.

A technique according to the present disclosure reduces both a harmonic component (motor input power harmonic) that occurs in a power input into a motor and a harmonic component (electromagnetic exciting force harmonic) that occurs in an electromagnetic exciting force of the motor. The electromagnetic exciting force contains forces of a rotation direction component (circumferential direction component), a radial direction component, and an axial direction component. The torque ripple corresponds to a harmonic component in the rotation direction component of the electromagnetic exciting force.

Figure 4:
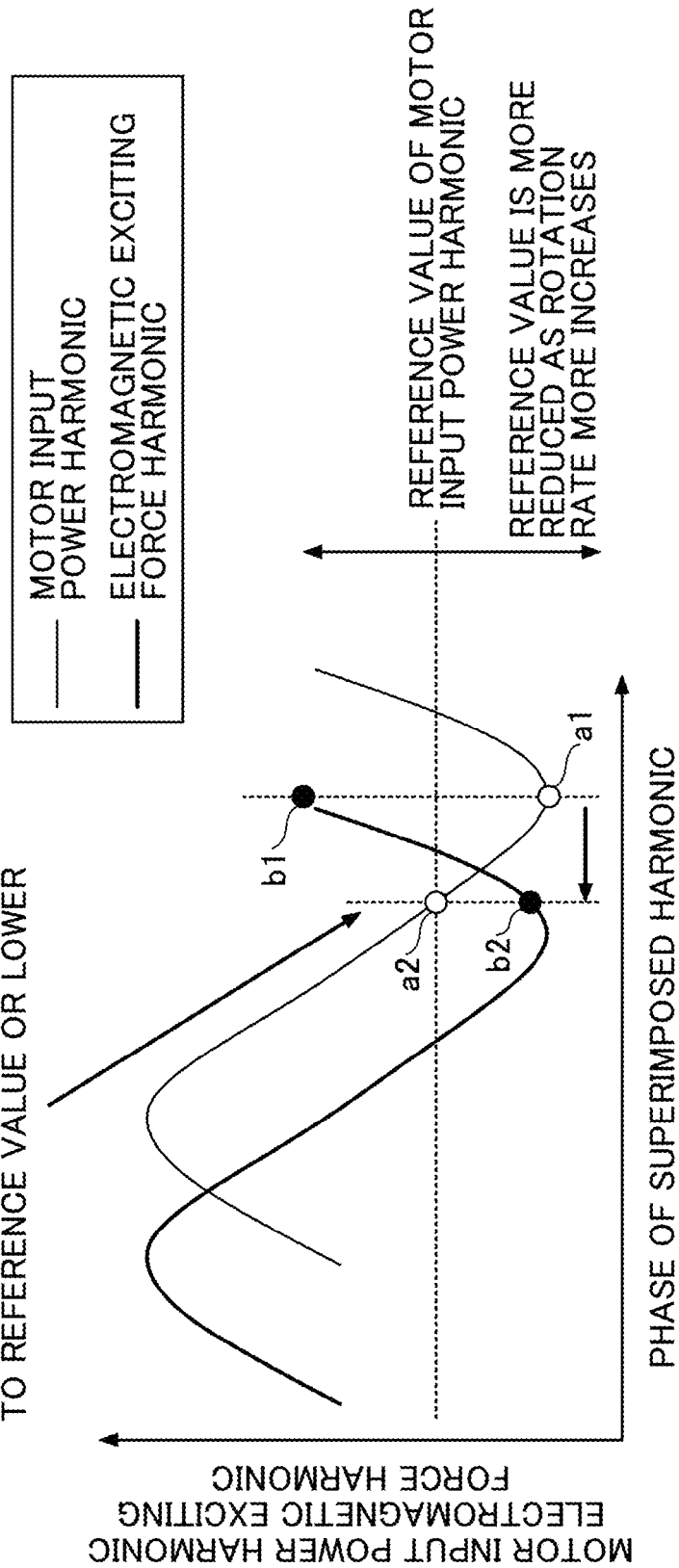
FIG. 4 is a diagram illustrating a motor control method, which is one of the techniques of the present disclosure for reducing a harmonic component that occurs in a power input into a motor and a harmonic component that occurs in an electromagnetic exciting force of the motor.

FIG. 4 is a diagram illustrating a motor control method, which is one of the techniques of the present disclosure for reducing a motor input power harmonic and an e electromagnetic exciting force harmonic.

The motor control method according to the present disclosure reduces a motor input power harmonic and an electromagnetic exciting force harmonic by suppressing the amplitude of the motor input power harmonic to be lower than or equal to a predetermined value and suppressing the amplitude of the electromagnetic exciting force harmonic having the same frequency as the motor input power harmonic to be lower than the amplitude of the electromagnetic exciting force harmonic in a case of the amplitude of the motor input power harmonic being suppressed to a minimum. The motor input power harmonic is an example of the first harmonic component that occurs synchronously with the rotation rate of the motor in the power input into the motor. The electromagnetic exciting force harmonic having the same frequency as the motor input power harmonic is an example of the second harmonic component that occurs in the electromagnetic exciting force of the motor at the same frequency as the first harmonic component. Such a motor control method of the present disclosure can reduce a power supply harmonic to be lower than or equal to a regulatory power supply harmonic value and can reduce the amplitude of the electromagnetic exciting force harmonic to be lower than the amplitude of the electromagnetic exciting force harmonic in a case of the amplitude of the motor input power harmonic being suppressed to a minimum, by setting a predetermined value as a regulatory value for a harmonic component in a power input into the motor, the regulatory value being calculated from the regulatory power supply harmonic value.

"When the amplitude of the first harmonic component (in this example, the motor input power harmonic) is suppressed to a minimum" means "when the amplitude of the first harmonic component is suppressed to a local minimum value by a motor control". When a plurality of local minimum values exist, the local minimum value may be the lowest local minimum value among the plurality of local minimum values. Theoretically, a local minimum value is a value (zero) reached by complete suppression. However, there is a case where zero cannot be reached due to a control limit. FIG. 4 illustrates an example of a state in which the amplitude of the electromagnetic exciting force harmonic is suppressed to an amplitude value b2 that is lower than an amplitude value b1 assumed by the amplitude of the electromagnetic exciting force harmonic when the amplitude of the motor input power harmonic is suppressed to a minimum amplitude value a1. In the example illustrated in FIG. 4, the amplitude of the motor input power harmonic is suppressed to an amplitude value a2 such that it does not exceed a reference value, and the amplitude of the electromagnetic exciting force harmonic is suppressed to the amplitude value b2.

Figure 5:
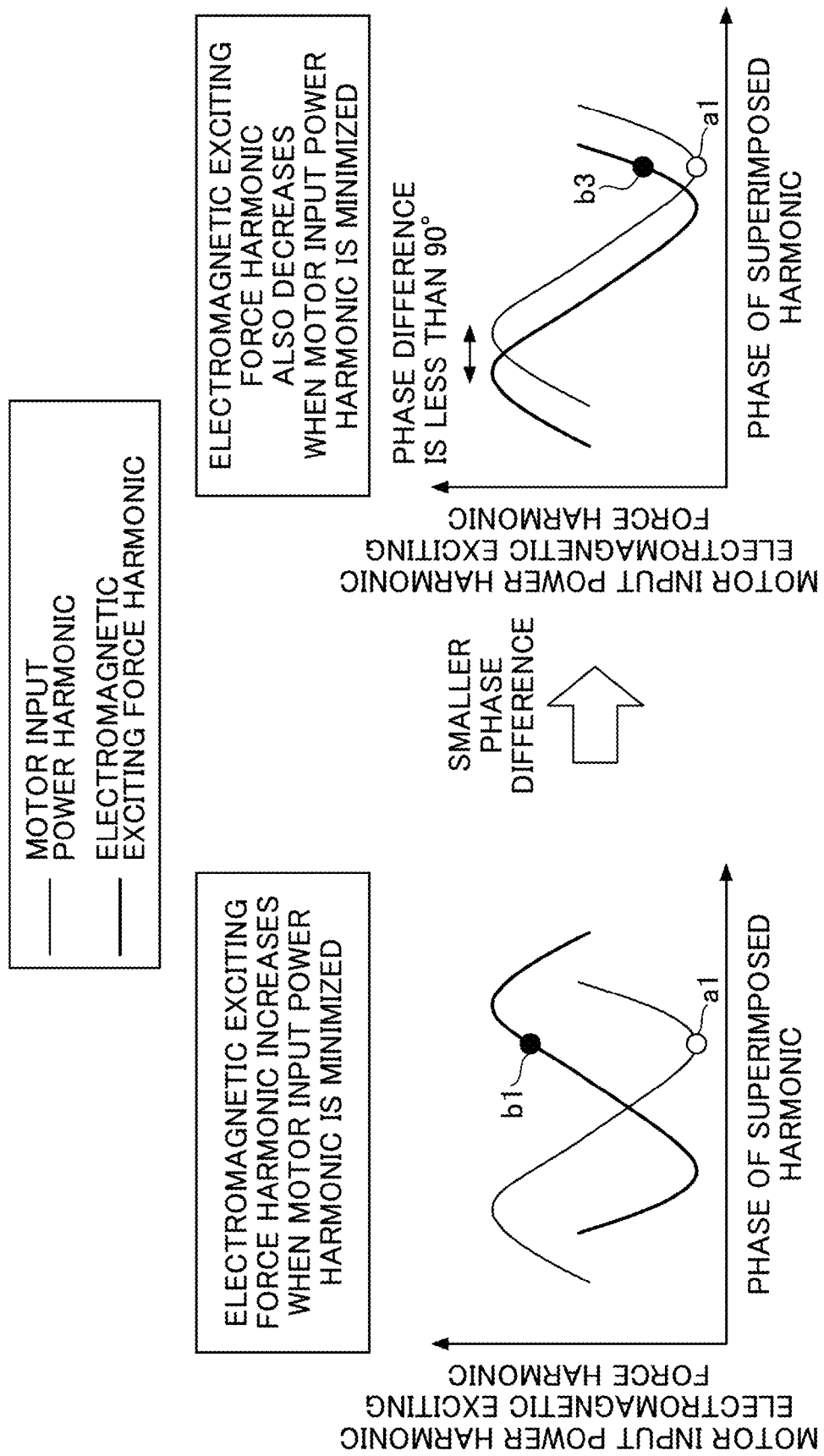
FIG. 5 is a diagram illustrating a motor structure, which is one of the techniques of the present disclosure for reducing a harmonic component that occurs in a power input into a motor and a harmonic component that occurs in an electromagnetic exciting force of the motor.

FIG. 5 is a diagram illustrating a motor structure, which is one of the techniques of the present disclosure for reducing a motor input power harmonic and an electromagnetic exciting force harmonic. As described above, it is difficult to reduce the amplitude of the electromagnetic exciting force harmonic merely by minimizing the amplitude of the motor input power harmonic.

The motor according to the present disclosure has a motor structure that makes the condition under which the amplitude of the motor input power harmonic becomes minimum close to the condition under which the amplitude of the electromagnetic exciting force harmonic becomes minimum. Such a motor structure ensures reduction in the amplitude of the electromagnetic exciting force harmonic along with reduction in the amplitude of the motor input power harmonic. For example, the motor according to the present disclosure has a motor structure that makes the phase difference between a waveform for compensation that minimizes the amplitude of the motor input power harmonic and a waveform for compensation that minimizes the amplitude of the electromagnetic exciting force harmonic less than 90°. This motor structure can reduce the amplitude of the electromagnetic exciting force harmonic from the amplitude value b1 to the amplitude value b3, when the amplitude of the motor input power harmonic is reduced to the amplitude value a1, as illustrated in FIG. 5.

In order to realize a motor structure that makes the condition under which the amplitude of the motor input power harmonic becomes minimum close to the condition under which the amplitude of the electromagnetic exciting force harmonic becomes minimum, it is preferable that the inductance of the motor is as low as possible, in order that the energy to be stored in a coil of the motor may be low. In order to make the inductance low, it is effective to employ a motor including a coil having a reduced number of turns, or a surface magnet synchronous motor.

Next, a configuration example of the motor control apparatus to which the techniques of the present disclosure are applied will be described.

Figure 6:
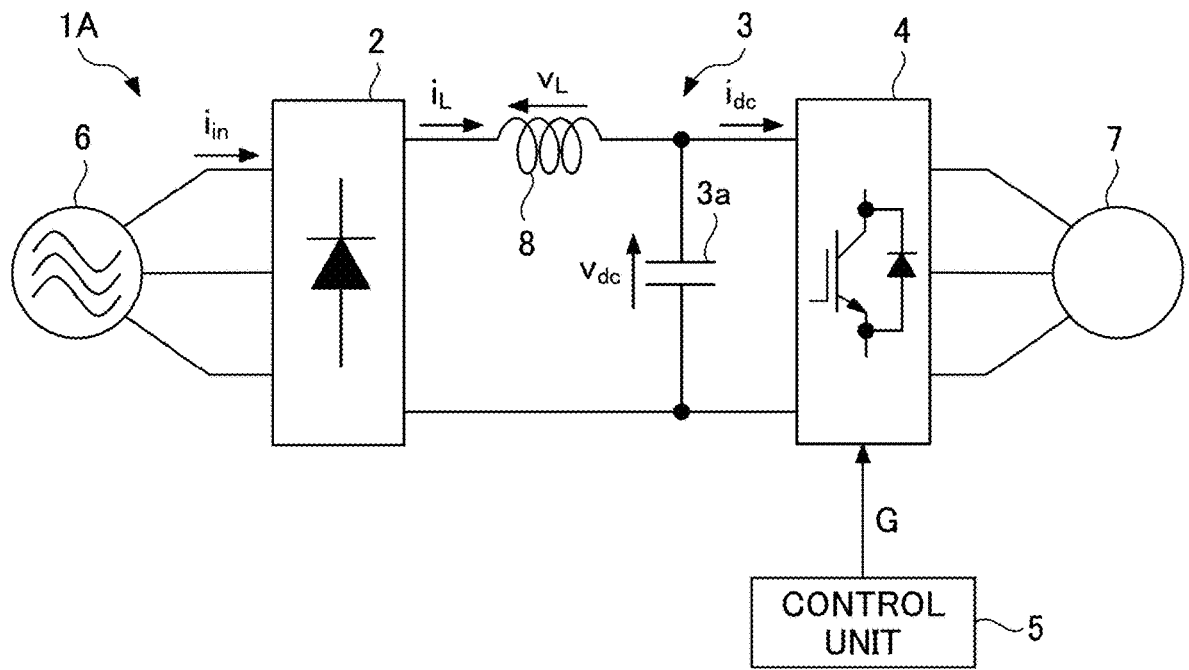
FIG. 6 is a diagram illustrating a first configuration example of a motor control apparatus.

FIG. 6 is a block diagram illustrating a first configuration example of the motor control apparatus to which the techniques of the present disclosure are applied. The motor control apparatus 1A illustrated in FIG. 6 includes a converter circuit 2, a direct-current link section 3, an inverter circuit 4, and a control unit 5, and is configured to convert an input alternating-current power supplied from a three-phase alternating-current power supply 6 to an output alternating-current power having a predetermined voltage and a predetermined frequency, and supply the output alternating-current power to a motor 7.

The motor 7 is, for example, a three-phase alternating-current motor. A specific example of the motor 7 is an electric motor configured to drive a compressor provided in a refrigerant circuit of an air conditioner. The motor 7 is, for example, a concentrated winding motor such as a four-pole six-slot type and a six-pole nine-slot type. There is a high tendency that a voltage induced in the motor 7 contains fifth-order and seventh-order components of the fundamental frequency as harmonic components. A high-order (e.g., sixth-order) harmonic component that is due to this motor voltage distortion (the fifth-order and seventh-order harmonic components of the fundamental frequency) may appear in a power input into the motor 7 and at an input side of the inverter circuit 4. This high-order harmonic component may appear in a power supply current $i_{in}$ of the alternating-current power supply 6, a direct-current link voltage $v_{dc}$ of the direct-current link section 3, a reactor voltage $v_L$ across both ends of a reactor 8, a reactor current $i_L$ flowing through the reactor 8, or a direct current $i_{dc}$ flowing through the direct-current link section 3.

The converter circuit 2 is connected to the alternating-current power supply 6, and configured to convert an alternating current output by the alternating-current power supply 6 to a direct current. The converter circuit 2 is a diode bridge circuit in which a plurality of (in this example, six) diodes are connected in a bridge formation. These diodes are configured to rectify the full wave of the alternating-current voltage of the alternating-current power supply 6 to convert it to a direct-current voltage. The converter circuit 2 may be a voltage converter circuit of any other circuit configuration different from a diode bridge, so long as it is a circuit configured to supply the direct-current power obtained by conversion to the inverter circuit 4 via the direct-current link section 3.

The direct-current link section 3 includes a capacitor 3a connected between the converter circuit 2 and the inverter circuit 4. The capacitor 3a is connected in parallel to the output portion of the converter circuit 2, and a direct-current voltage (direct-current link voltage $v_{dc}$) occurring across both ends of the capacitor 3a is input into an input node of the inverter circuit 4. The capacitor 3a will further be described below.

The direct-current link section 3 includes a reactor 8 connected between the converter circuit 2 and the inverter circuit 4. The reactor 8 is inserted in series in a direct-current bus line between the output portion of the converter circuit 2 and the input portion of the inverter circuit 4.

With its input node connected in parallel to the capacitor 3a of the direct-current link section 3, the inverter circuit 4 is configured to switch an output from the direct-current link section 3 to invert it to a three-phase alternating current, and supply it to the motor 7 connected to the inverter circuit 4. The inverter circuit 4 of the present embodiment is formed of a plurality of switching elements that are connected in a bridge formation. The inverter circuit 4 includes six switching elements, because the inverter circuit 4 outputs the three-phase alternating current to the motor 7. Specifically, the inverter circuit 4 includes three switching legs connected in parallel to one another, and each switching leg includes two switching elements connected in series to each other. The middle point between an upper arm switching element and a lower arm switching element of each switching leg is connected to a coil of a corresponding phase of the motor 7. A freewheeling diode is connected in anti-parallel to each switching element. Through ON-OFF operations of these switching elements, the inverter circuit 4 switches the direct-current link voltage $v_{dc}$ input from the direct-current link section 3 to invert it to a three-phase alternating-current voltage, and supplies it to the motor 7. The control of the ON-OFF operations is performed by the control unit 5.

The control unit 5 is configured to perform a control to suppress the amplitude of a first harmonic component that occurs synchronously with the rotation rate of the motor 7 in a power input into the motor 7 to be lower than or equal to a predetermined value, and to suppress the amplitude of a second harmonic component that occurs in an electromagnetic exciting force of the motor 7 at the same frequency as the first harmonic component to be lower than the amplitude of the second harmonic component in a case of the amplitude of the first harmonic component being suppressed to a minimum. The control unit 5 controls switching (ON-OFF operations) of the inverter circuit 4 such that the amplitude of the first harmonic component and the amplitude of the second harmonic component are suppressed in this manner.

Figure 7:
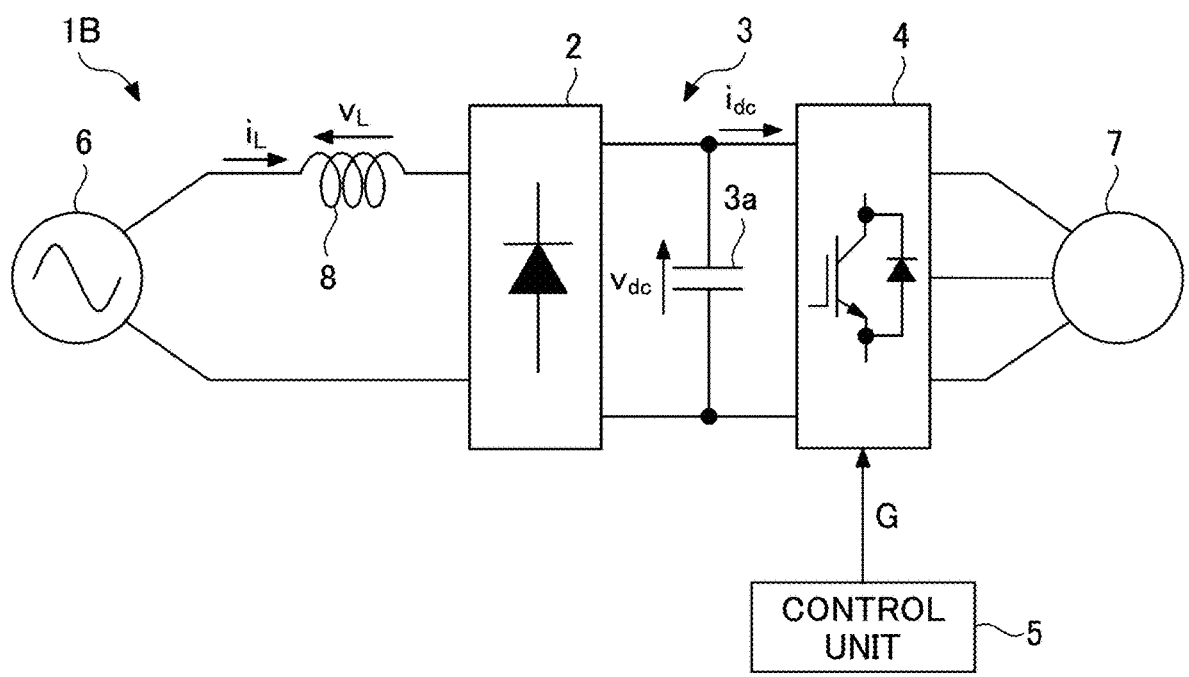
FIG. 7 is a diagram illustrating a second configuration example of a motor control apparatus.

FIG. 7 is a diagram illustrating a second configuration example of the motor control apparatus to which the techniques of the present disclosure are applied. The foregoing description will be referred to for any components that are the same as those in the first configuration example, to omit description about such components. A motor control apparatus 1B illustrated in FIG. 7 includes a converter circuit 2, a direct-current link section 3, an inverter circuit 4, and a control unit 5, and is configured to convert an input alternating-current power supplied from a single-phase alternating-current power supply 6 to an output alternating-current power having a predetermined voltage and a predetermined frequency, and supply it to the motor 7.

The converter circuit 2 is connected to the alternating-current power supply 6 via a reactor 8, and configured to rectify (convert) an alternating current output by the alternating-current power supply 6 to a direct current. The converter circuit 2 is, for example, a diode bridge circuit in which a plurality of (in this example, four) diodes are connected in a bridge formation. These diodes are configured to rectify the full wave of the alternating-current voltage of the alternating-current power supply 6 to convert it to a direct-current voltage. The converter circuit 2 may be a voltage converter circuit of any other circuit configuration different from a diode bridge, so long as it is a circuit configured to supply the direct-current power obtained by conversion to the inverter circuit 4 via the direct-current link section 3.

The reactor 8 is connected between the alternating-current power supply 6 and the converter circuit 2, more specifically, inserted in series between the alternating current output side of the alternating-current power supply 6 and the alternating-current input side of the converter circuit 2.

In FIGS. 6 and 7, the capacitance of the capacitor 3a is set such that even though an output of the converter circuit 2 is almost unable to be smoothed, a ripple voltage (i.e., a voltage variation matching a switching frequency $f_c$) that is due to a switching operation of the inverter circuit 4 can be suppressed. Specifically, the capacitor 3a is formed of a low-capacitance capacitor (e.g., a film capacitor) having a capacitance (e.g., approximately some tens of microfarads (μF) through some hundreds of microfarads (μF)) that is approximately one hundredths of the capacitance of a smoothing capacitor (e.g., an electrolytic capacitor) that is used for smoothing an output of the converter circuit 2 in a typical power converter apparatus or motor control apparatus.

Since the capacitance of the capacitor 3a is such a low value as specified, an output of the converter circuit 2 is almost not smoothed in the direct-current link section 3, and a pulsating component matching the frequency of the power supply voltage $v_{in}$ of the alternating-current power supply 6 will consequently remain in the direct-current voltage (direct-current link voltage $v_{dc}$). For example, the direct-current link voltage $v_{dc}$ contains a pulsating component having a frequency that is six times higher than the frequency of the power supply voltage $v_{in}$ of the three-phase alternating-current power supply 6 of FIG. 6, or contains a pulsating component having a frequency that is twice higher than the frequency of the power supply voltage $v_{in}$ of the single-phase alternating-current power supply 6 of FIG. 7.

When not only the capacitor 3a but also the reactor 8 are used in the power converter apparatus, the reactor 8 and the capacitor 3a constitute an LC filter. The inductance of the reactor 8 and the capacitance of the capacitor 3a are set such that the resonance frequency $f_r$ of this LC filter is a frequency that is higher than or equal to an N-time multiple of the commercial frequency $f_{in}$ of the N-phase alternating-current power supply 6, and such that a ripple voltage due to a switching operation of the inverter circuit 4 will be decayed.

$$N \times f_{in} \leq f_r \leq f_c/4$$

$$f_r = 1/(2\pi\sqrt{(LC)})$$

where L represents the inductance of the reactor 8, and C represents the capacitance of the capacitor 3a.

When the motor control apparatus is a capacitor-less inverter (more specifically, an electrolytic capacitor-less inverter) in which the capacitance of the capacitor 3a of the direct-current link section 3 is such a low value as specified, there is a risk that a harmonic that is due to a distortion component (harmonic component) occurring in a power input into the motor 7 may flow out into the power supply side. When the motor control apparatus is a matrix converter, there is likewise a risk that a harmonic due to a distortion component occurring in a power input into the motor may flow out into the power supply side.

The control unit 5 illustrated in FIG. 6 or FIG. 7 is configured to perform a control to suppress the amplitude of a first harmonic component that occurs synchronously with the rotation rate of the motor 7 in a power input into the motor 7 to be lower than or equal to a predetermined value, and to suppress the amplitude of a second harmonic component that occurs in the electromagnetic exciting force of the motor 7 at the same frequency as the first harmonic component to be lower than the amplitude of the second harmonic component in a case of the amplitude of the first harmonic component being suppressed to a minimum. This control is also referred to as a harmonic suppressing control. Because the amplitudes of the first harmonic component and the second harmonic component are reduced through the harmonic suppressing control, vibrations due to a harmonic (e.g., a power supply harmonic flowing out into the power supply side) that occurs at the input side of the inverter circuit 4 and the electromagnetic exciting force can be reduced.

For example, the control unit 5 superimposes an amount of compensation C that changes synchronously with the rotation rate of the motor 7 on an amount of operation D of the motor control apparatus illustrated in FIG. 6 or FIG. 7. Hence, it is possible to easily realize reduction in the amplitudes of the first harmonic component and the second harmonic component.

For example, the control unit 5 detects a value f correlating with the first harmonic component that occurs synchronously with the rotation rate of the motor 7 in a power input into the motor 7 by, for example, Fourier transform. A harmonic having the same order as the sixth-order harmonic component that occurs in the power input into the motor also occurs in a power at the input side of the inverter circuit. Hence, the value f correlating with the first harmonic component that occurs synchronously with the rotation rate of the motor 7 in the power input into the motor 7 is, for example, the amplitude of a harmonic component that occurs synchronously with the rotation rate of the motor 7 in the reactor voltage $v_L$, the reactor current $i_L$, the direct-current link voltage $v_{dc}$, the direct current $i_{dc}$, or the power supply current $i_{in}$. A harmonic component that occurs synchronously with the rotation rate of the motor 7 in the reactor voltage $v_L$, the reactor current $i_L$, the direct-current link voltage $v_{dc}$, or the direct current $i_{dc}$ has, for example, the same frequency as the first harmonic component. A harmonic component that occurs synchronously with the rotation rate of the motor 7 in the power supply current $i_{in}$ has, for example, a frequency, which is the frequency of the first harmonic component±the frequency of the power supply voltage.

Figure 8:
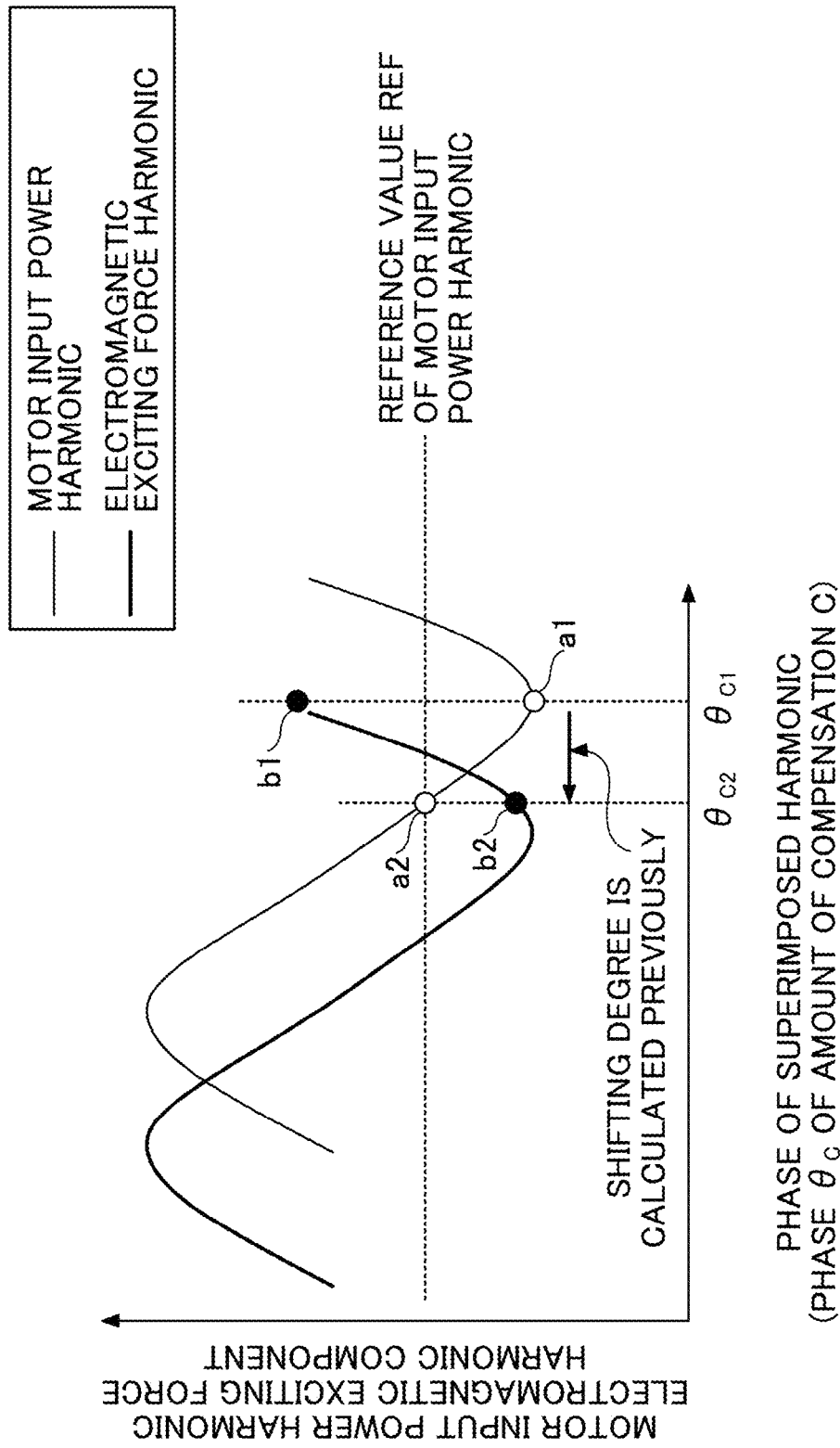
FIG. 8 is a diagram illustrating derivation of an amount of compensation to be superimposed on an amount of operation of a motor control apparatus.

The control unit 5 detects the value f correlating with the first harmonic component that occurs synchronously with the rotation rate of the motor 7 in the power input into the motor 7, and derives either or both of an amplitude and a phase of an amount of correction C at which the detected value f becomes minimum. The control unit 5 corrects either or both of the amplitude and the phase of the amount of correction C at which the detected value f becomes minimum, such that the amplitude of the first harmonic component becomes lower than or equal to a reference value REF and the amplitude of the second harmonic component becomes lower, based on a relationship between the first harmonic component and the second harmonic component. In the example illustrated in FIG. 8, the control unit 5 corrects the phase $\theta_c$ of the amount of compensation C, from $\theta_{c1}$ to $\theta_{c2}$.

For example, data based on which either or both of the amplitude and the phase of the amount of correction C, at which the amplitude of the first harmonic component becomes lower than or equal to the reference value REF and the amplitude of the second harmonic component becomes lower, is or are determined is defined in the relationship between the first harmonic component and the second harmonic component. This relationship is kept in a memory in the form of a previously calculated table or formula.

Next, a configuration example of the control unit 5 configured to perform the harmonic suppressing control will be described.

Figure 9:
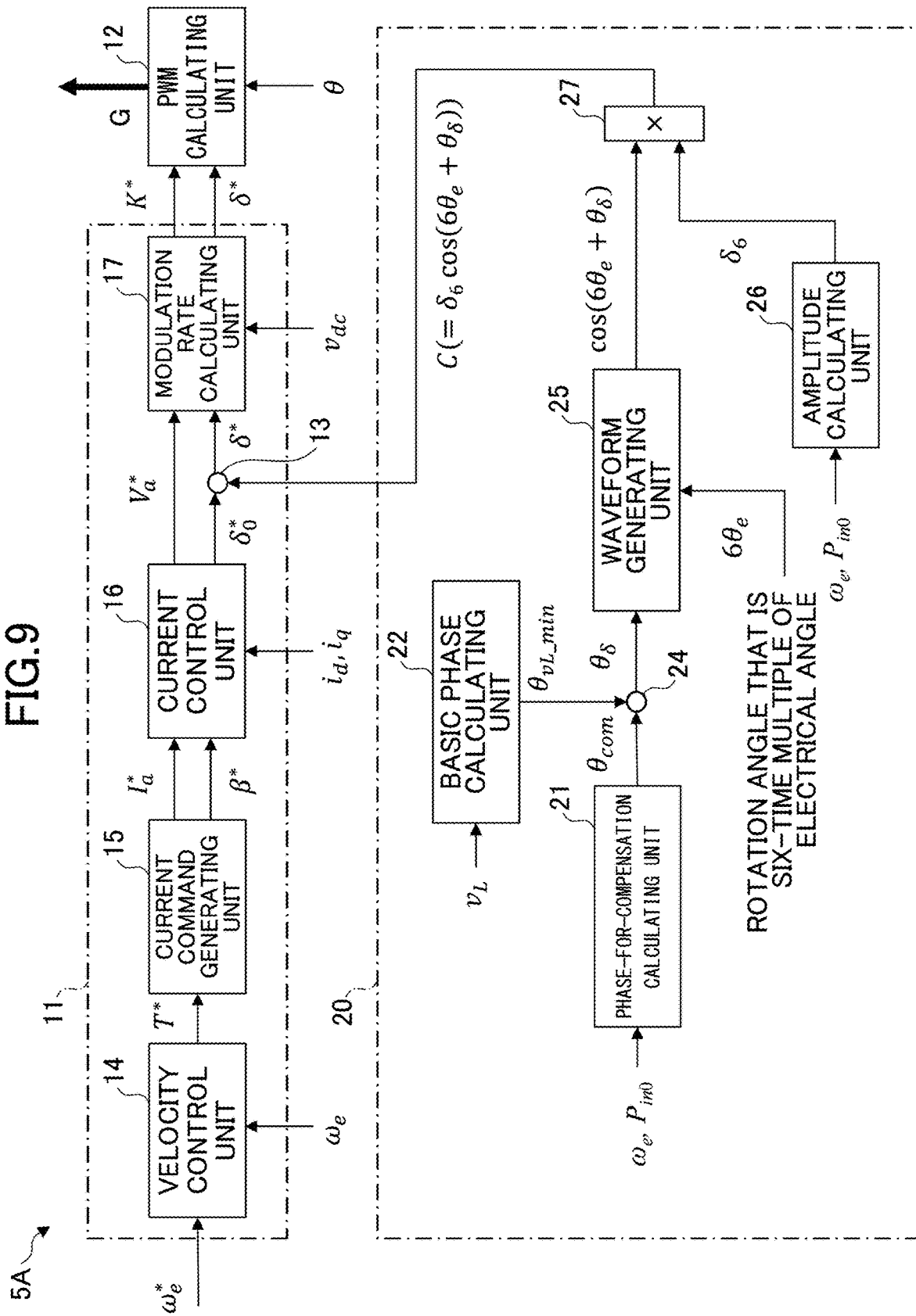
FIG. 9 is a block diagram illustrating a first configuration example of a control unit.

FIG. 9 is a block diagram illustrating a first configuration example of the control unit. The control unit 5A illustrated in FIG. 9 is an example of the control unit 5. The control unit 5A is configured to output a gate control signal G for switching ON or OFF each switching element in the inverter circuit 4 to the inverter circuit 4. The control unit 5A includes a motor control unit 11, a compensating unit 20, and a PWM calculating unit 12.

The function of each unit included in the control unit 5A is realized by, for example, a processor such as a Central Processing Unit (CPU) operating in accordance with a program that is readably stored in a memory. The function of each unit may also be realized by a Field Programmable Gate Array (FPGA) or an Application Specific Integrated Circuit (ASIC).

The motor control unit 11 is configured to generate and output a phase (voltage phase δ[°]) of an alternating-current voltage output by the inverter circuit 4 and a voltage control rate K of the inverter circuit 4. The voltage control rate is also referred to as a modulation rate. The superscript "*" as in "δ" represents a command value. The unit symbol in the brackets [ ] represents an example unit.

The motor control unit 11 includes, for example, a velocity control unit 14, a current command generating unit 15, a current control unit 16, an adder 13, and a modulation rate calculating unit 17. The velocity control unit 14 is configured to generate a command torque T* [Nm] of the motor 7 such that the deviation between a command rotation rate $\omega_e^*$ [rad/s] of the motor 7 and a detected rotation rate $\omega_e$ [rad/s] of the motor 7 becomes zero. The current command generating unit 15 is configured to generate an amplitude $I_a^*$ [A] and a phase β* [°] of the current vector of a current input into the motor 7 based on the command torque T*. The current control unit 16 is configured to generate an amplitude $V_a^*$ [V] and a phase $\delta_0^*$ [°] of the voltage vector of a voltage (e.g., a line voltage) that is input into the motor 7 based on the amplitude $I_a^*$ and the phase β* of the current vector, and a d-axis current $i_d$ and a q-axis current $i_q$ of the motor 7. $\delta_0^*$ represents the zeroth-order component of the voltage phase δ. The adder 13 is configured to generate a command value δ* of the voltage phase δ by adding an amount of compensation C to be generated by the compensating unit 20 to the phase $\delta_0^*$ of the voltage vector. In this way, in the example illustrated in FIG. 9, the amount of compensation C that changes synchronously with the rotation rate of the motor 7 is superimposed on the voltage phase δ, which is an example of an amount of operation D. The modulation rate calculating unit 17 is configured to generate a command value K* of the voltage control rate K based on the amplitude $V_a^*$ of the voltage vector and a detected value of the direct-current link voltage $v_{dc}$. Here, the detected rotation rate and the command rotation rate may be a mechanical angular velocity or an electrical angular velocity. The electrical angular velocity is obtained by multiplying the mechanical angular velocity by the number of pole pairs in the motor. The mechanical angular velocity represents the rotation rate of the motor in the form of an angle by which the motor rotates per unit time.

The compensating unit 20 is configured to calculate an amount of compensation C based on which a harmonic in a power input into the motor 7 is offset. The compensating unit 20 includes, for example, a basic phase calculating unit 22, a phase-for-compensation calculating unit 21, an adder 24, a waveform generating unit 25, an amplitude calculating unit 26, and a multiplier 27.

In the example illustrated in FIG. 9, the basic phase calculating unit 22 is configured to detect the amplitude of a harmonic component that occurs synchronously with the rotation rate of the motor 7 in the reactor voltage $v_L$ by, for example, Fourier transform, as the value f correlating with a motor input power harmonic that occurs synchronously with the rotation rate of the motor 7 in the power input into the motor 7. The basic phase calculating unit 22 calculates a basic phase $\theta_{vL\_min}$ at which the detected amplitude of the harmonic component in the reactor voltage $v_L$ is minimum, by using, for example, a hill-climbing method.

The phase-for-compensation calculating unit 21 is configured to calculate a phase for compensation $\theta_{com}$ to be offset from the basic phase $\theta_{vL\_min}$, based on at least one selected from the detected rotation rate $\omega_e$ of the motor 7, the command rotation rate $\omega_e^*$ of the motor 7, and an input power $P_{in0}$ input into the motor 7. The input power $P_{in0}$ represents, for example, an average value of the input power. For example, the phase-for-compensation calculating unit 21 generates a phase for compensation $\theta_{com}$ corresponding to the detected rotation rate $\omega_e$, based on such a correlation between the detected rotation rate $\omega_e$ and the phase for compensation $\theta_{com}$ as will make the amplitude of an electromagnetic exciting force harmonic, which occurs at the same frequency as the motor input power harmonic, lower than or equal to a predetermined threshold. The correlation that will make the amplitude of an electromagnetic exciting force harmonic, which occurs at the same frequency as the motor input power harmonic, lower than or equal to a predetermined threshold is, for example, a relational rule previously determined by, for example, a test, and is defined by, for example, a lookup table or an operation expression. When the detected rotation rate $\omega_e$ is replaced with the command rotation rate $\omega_e^*$ or the input power $P_{in0}$, a suitable phase for compensation $\theta_{com}$ can likewise be obtained using a correlation of this sort.

The adder 24 is configured to calculate a corrected phase $\theta_\delta$ by adding the phase for compensation $\theta_{com}$ to the basic phase $\theta_{vL\_min}$.

The waveform generating unit 25 is configured to generate a periodic waveform $\cos(6_e+\theta_\delta)$ by adding the corrected phase $\theta_\delta$ to a rotation angle $6\theta_e$, which is six times greater than the electrical angle of the motor 7.

The amplitude calculating unit 26 is configured to calculate an amplitude $\delta_6$ of an amount of compensation C, based on at least one selected from the detected rotation rate w e of the motor 7, the command rotation rate $\omega_e^*$ of the motor 7, and the input power $P_{in0}$ in the motor 7. For example, the amplitude calculating unit 26 generates an amplitude $\delta_6$ corresponding to the detected rotation rate $\omega_e$, based on such a correlation between the detected rotation rate $\omega_e$ and the amplitude $\delta_6$ as will make the amplitude of the motor input power harmonic and the amplitude of the electromagnetic exciting force harmonic, which occurs at the same frequency as the motor input power harmonic, lower than or equal to a predetermined threshold. The correlation that will make the amplitude of the motor input power harmonic and the amplitude of the electromagnetic exciting force harmonic, which occurs at the same frequency as the motor input power harmonic, lower than or equal to a predetermined threshold is, for example, a relational rule previously determined by, for example, a test, and is defined by, for example, a lookup table or an operation expression. When the detected rotation rate $\omega_e$ is replaced with an output torque $T_e$ or the input power $P_{in0}$, a suitable amplitude $\delta_6$ can likewise be obtained using a correlation of this sort.

The multiplier 27 is configured to calculate an amount of compensation C $(=\delta_6 \sin(6\theta_e+\theta_\delta))$ by multiplying $\cos((6\theta_e+\theta_\delta))$ by the amplitude $\theta_6$. By the adder 13 adding the amount of compensation C generated by the compensating unit 20 to the phase $\delta_0^*$ generated by the motor control unit 11, the command value δ* of the voltage phase δ is generated.

The PWM calculating unit 12 is configured to generate a voltage command value for three phases including a u-phase, a v-phase, and a w-phase based on the command value K* of the voltage control rate K and the command value δ* of the voltage phase δ, using, for example, a polar coordinates transform, inverse Park transform, and space vector transform. The three-phase voltage command value is a Pulse Width Modulated (PWM) signal. The PWM calculating unit 12 can control the magnitude of an alternating-current voltage to be output from the inverter circuit 4, by adjusting the amplitude of the three-phase voltage command value in accordance with the command value K* of the voltage control rate K. The PWM calculating unit 12 converts the three-phase voltage command value to a gate control signal G, and outputs it to the inverter circuit 4.

In this way, the control unit 5A detects a value correlating with a motor input power harmonic, and determines either or both of the amplitude and the phase of the amount of compensation C based on a relationship between the motor input power harmonic and an electromagnetic exciting force harmonic that occurs at the same frequency as the motor input power harmonic. Hence, it is possible to reduce the motor input power harmonic and the electromagnetic exciting force harmonic.

In the example illustrated in FIG. 9, the compensating unit 20 superimposes the amount of compensation C on the voltage phase δ, which is an example of the amount of operation D. Instead, the compensating unit 20 may superimpose the amount of compensation C on at least one selected from the modulation rate K, the amplitude $V_a$, the phase δ, the amplitude $I_a$, and the phase β.

In the example illustrated in FIG. 9, the basic phase calculating unit 22 detects the amplitude of a harmonic component that occurs synchronously with the rotation rate of the motor 7 in the reactor voltage $v_L$ by, for example, Fourier transform, as the value f correlating with a motor input power harmonic that occurs synchronously with the rotation rate of the motor 7 in a power input into the motor 7. However, the amplitude of a harmonic component occurring in the reactor voltage $v_L$, which is to be detected by the basic phase calculating unit 22, may be replaced with the value f described above regarding, for example, the direct-current link voltage $v_{dc}$.

The basic phase calculating unit 22 may detect a value g correlating with an electromagnetic exciting force harmonic that occurs at the same frequency as a motor input power harmonic, and calculate a basic phase $\theta_{vL\_min}$ at which the amplitude of the detected value g is minimum, using, for example, a hill-climbing method. Alternatively, the basic phase calculating unit 22 may detect the value f correlating with a motor input power harmonic and the value g correlating with an electromagnetic exciting force harmonic that occurs at the same frequency as the motor input power harmonic, and calculate a basic phase $\theta_{vL\_min}$ at which the amplitudes of the detected values f and g are lower than or equal to a predetermined value, using, for example, a hill-climbing method.

Figure 10:
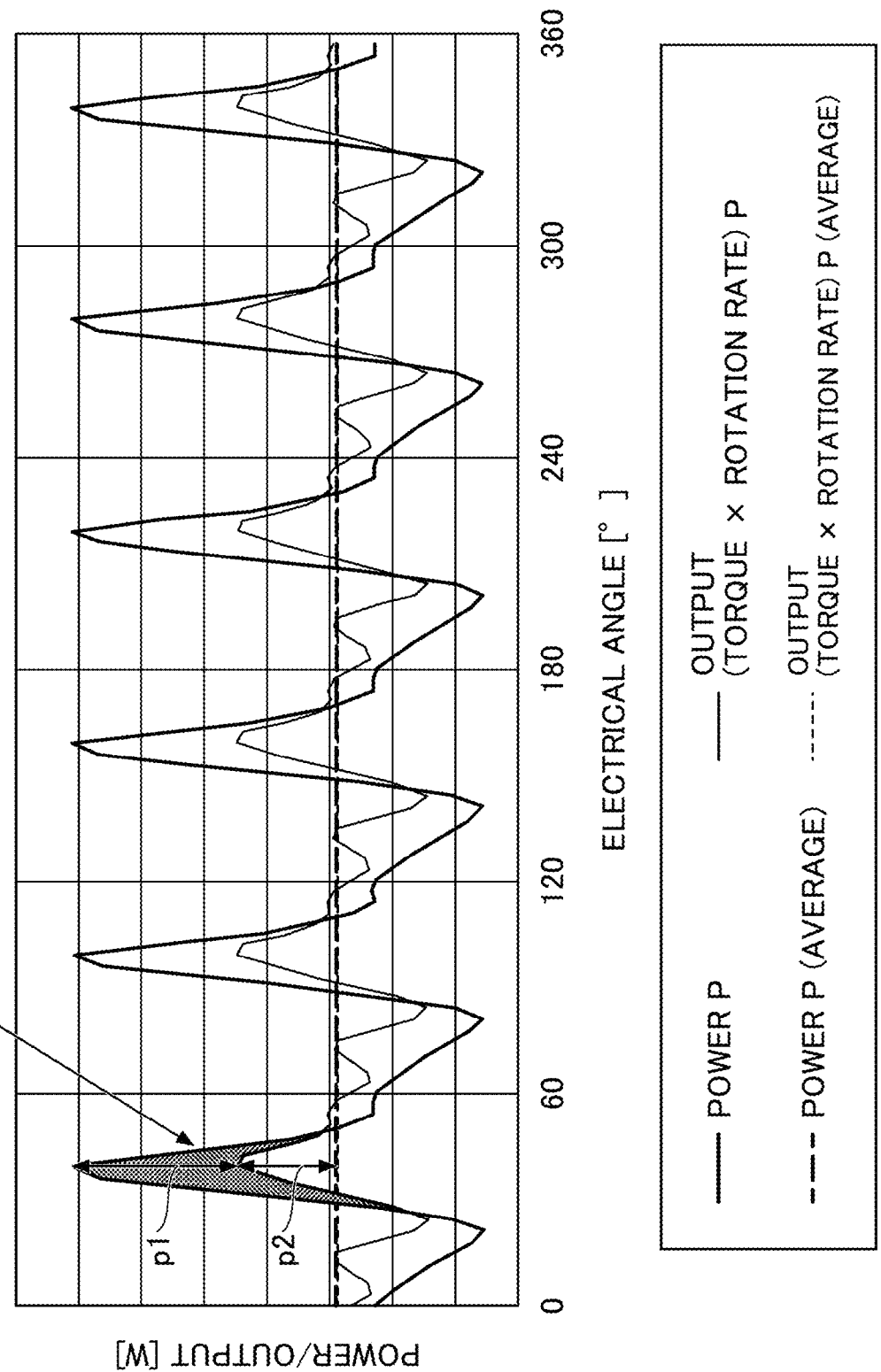
FIG. 10 is an example of a power and an output (=torque× rotation rate) of a motor derived by a magnetic field analysis with respect to an electrical angle of the motor.

FIG. 10 is an example of a power and an output (=torque× rotation rate) of a motor that are derived by a magnetic field analysis with respect to an electrical angle of the motor. The motor 7 according to the present disclosure is an electric motor controlled by the motor control apparatus configured to suppress a first harmonic component that occurs synchronously with the rotation rate of the motor 7 in a power input into the motor 7, or a second harmonic component that occurs in an electromagnetic exciting force of the motor 7 at the same frequency as the first harmonic component. Regarding this motor 7, when an amount of correction C is superimposed on an amount of operation D, it is preferable that a magnitude p1 of variation of a component of energy stored in the motor 7 having the same frequency as the first harmonic component is lower than a magnitude p2 of variation of a component of energy output through a torque of the motor 7 having the same frequency as the second harmonic component. This makes an amount of compensation C that reduces the amplitude of the harmonic in the power input into the motor 7 and an amount of compensation C that reduces the amplitude of the harmonic in the electromagnetic exciting force close to each other. Hence, it is possible to reduce the amplitude of the harmonic in the electromagnetic exciting force only by superimposing the amount of compensation C that reduces the amplitude of the harmonic in the power input into the motor 7.

Figure 11:
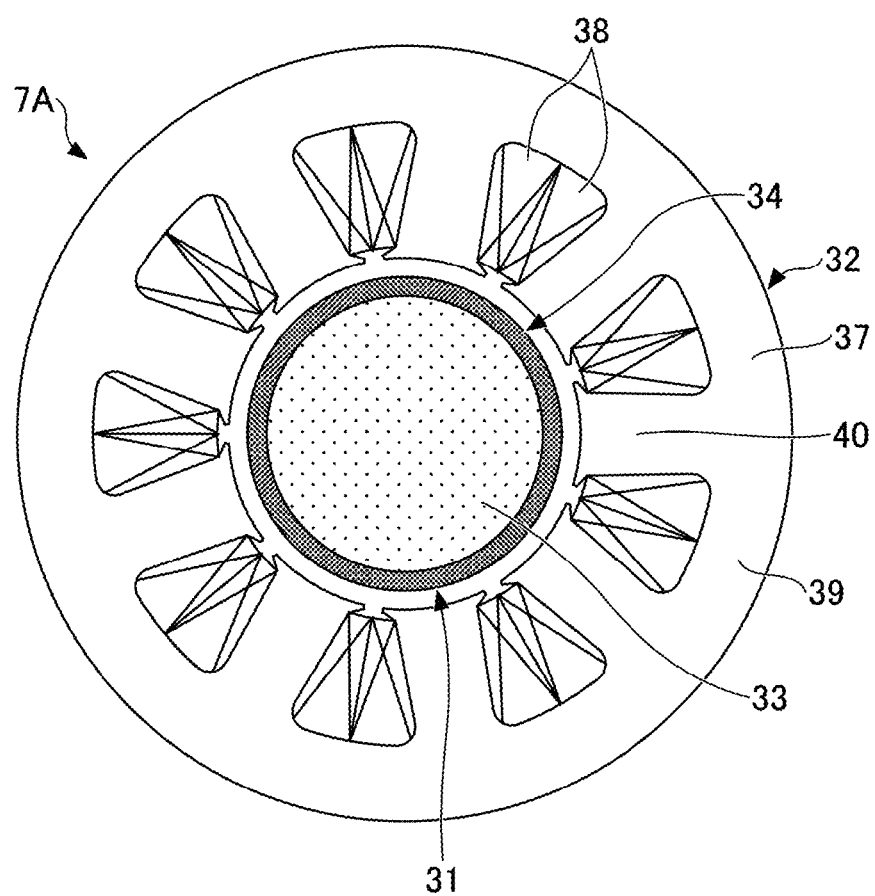
FIG. 11 is a cross-sectional view illustrating a surface magnet synchronous motor including a rotor and a stator.

FIG. 11 is a cross-sectional view illustrating a surface magnet synchronous motor 7A including a rotor 31 and a stator 32. The rotor 31 includes a rotor core 33, and a plurality of magnets 34 arranged in the circumferential direction of the rotor core 33. The stator 32 includes a stator core 37 and a coil 38. The stator core 37 includes a back yoke portion 39 and a plurality of teeth portions 40. The back yoke portion 39 is a portion formed in a substantially cylindrical shape. The back yoke portion 39 is formed of a magnetic material (e.g., an electromagnetic steel sheet). The plurality of teeth portions 40 are portions projecting from the internal periphery of the back yoke portion 39 inward in the radial direction. The teeth portions 40 are formed integrally with the back yoke portion 39. The teeth portions 40 are formed of a magnetic material (e.g., an electromagnetic steel sheet). The coil 38 is wound around the plurality of teeth portions 40. The coil 38 is formed of a conductor (e.g., copper) coated with an insulation material. The coil 38 is wound around each of the teeth portions 40 in a concentrated winding manner. The coil 38 may be wound around the plurality of teeth portions 40 in a distributed winding manner.

When compared with typical interior magnet synchronous motors, the inductance of the surface magnet synchronous motor 7A is lower, and energy to be stored in the coil 38 provided on the stator 32 of the motor 7A is hence lower and p1 indicated in FIG. 10 is lower. Therefore, an amount of compensation C that reduces the amplitude of a harmonic in a power input into the motor 7A and an amount of compensation C that reduces the amplitude of a harmonic in an electromagnetic exciting force are close to each other, and it is possible to reduce the amplitude of the harmonic in the electromagnetic exciting force only by superimposing the amount of compensation C that reduces the amplitude of the harmonic in the power input into the motor 7A.

Figure 12:
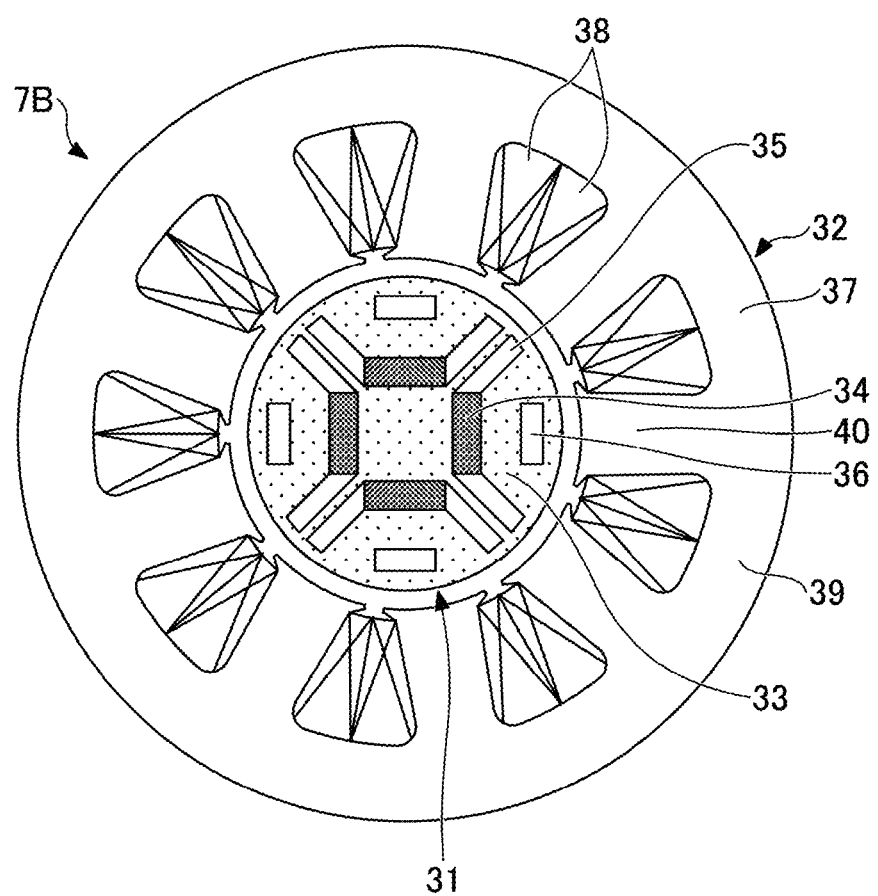
FIG. 12 is a cross-sectional view illustrating an interior magnet synchronous motor including a rotor and a stator.

FIG. 12 is a cross-sectional view illustrating an interior magnet synchronous motor 7B including a rotor 31 and a stator 32. The rotor 31 includes a rotor core 33, and a plurality of magnets 34 embedded in holes 35 formed in the rotor core 33. The holes 35 are slot-shaped voids. The rotor core 33 includes a magnetic resistance portions 36 provided to suppress a main magnetic flux of the magnets 34. When compared with typical interior magnet synchronous motors free of the magnetic resistance portions 36, the inductance of the motor 7B provided with the magnetic resistance portions 36 is lower, and energy to be stored in the coil 38 provided on the stator 32 of the motor 7B is hence lower and p1 indicated in FIG. 10 is lower. Therefore, an amount of compensation C that reduces the amplitude of a harmonic in a power input into the motor 7B and an amount of compensation C that reduces the amplitude of a harmonic in an electromagnetic exciting force are close to each other, and it is possible to reduce the amplitude of the harmonic in the electromagnetic exciting force only by superimposing the amount of compensation C that reduces the amplitude of the harmonic in the power input into the motor 7B.

The magnetic resistance portions 36 are, for example, cavities provided in the rotor core 33. The magnetic permeability through air existing in the cavities is lower than the magnetic permeability through the material (e.g., an electromagnetic steel sheet or a powder magnetic core) of the rotor core 33. Therefore, the magnetic resistance portions 36 suppress the main magnetic flux of the magnets 34. At least some of the magnetic resistance portions 36 may be replaced with a member (e.g., a nonmagnetic member) having a magnetic permeability lower than that of the material of the rotor core 33. Also in this case, the main magnetic flux of the magnets 34 can likewise be suppressed as can be suppressed by the air existing in the cavities.

Figure 13:
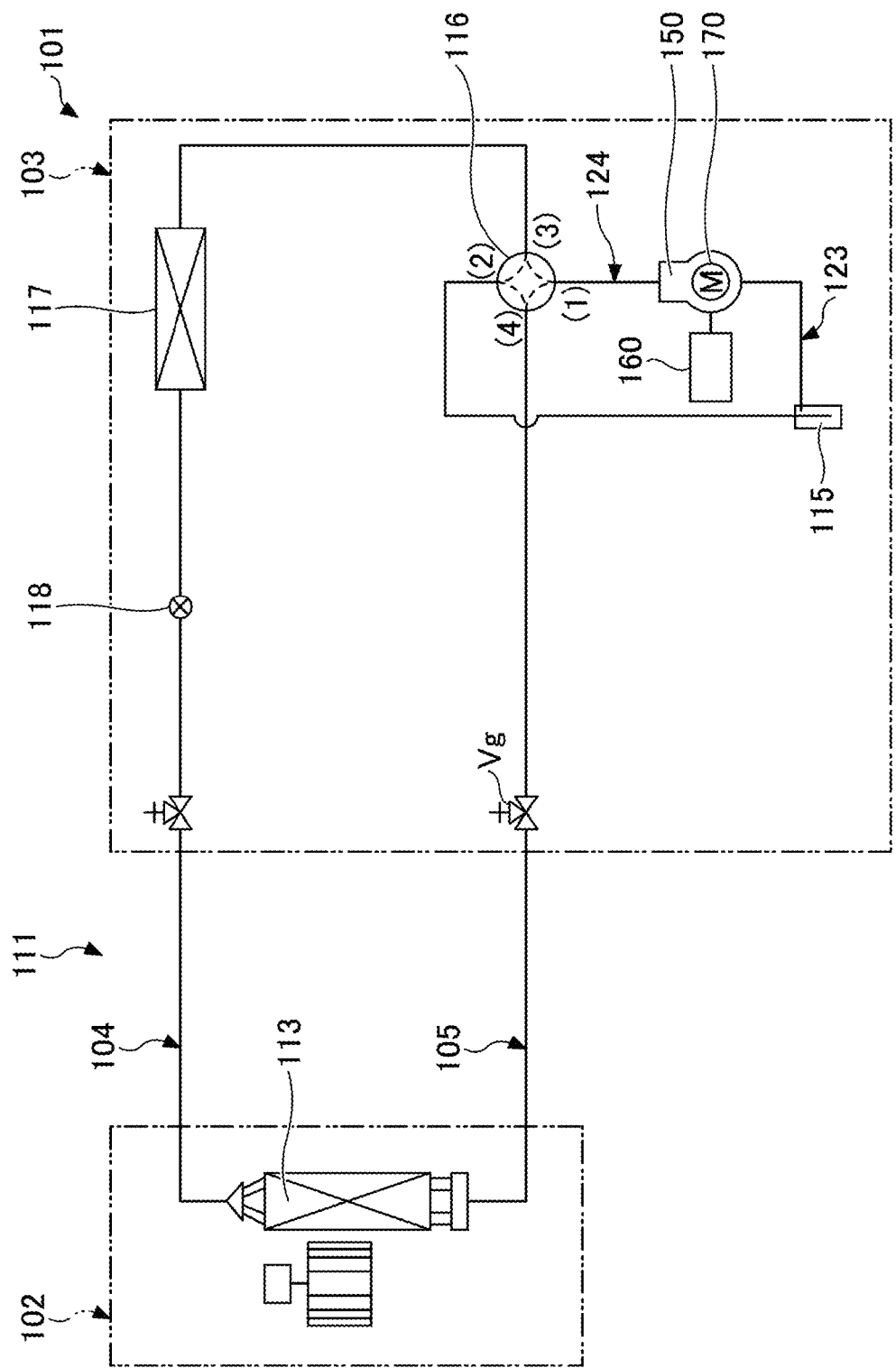
FIG. 13 is a diagram illustrating an example of a motor controlled by a motor control apparatus according to an embodiment or a refrigeration apparatus including a compressor driven by a motor according to an embodiment.

FIG. 13 is a diagram illustrating an example of a motor controlled by a motor control apparatus according to an embodiment or a refrigeration apparatus including a compressor driven by a motor according to an embodiment. FIG. 13 is a diagram illustrating an example of a refrigerant circuit of an air conditioner 101 in which a compressor 150 according to an embodiment is used. The air conditioner 101 is refrigeration cycle equipment (refrigeration apparatus) including a compressor 150. Examples of the air conditioner 101 in which the compressor 150 is used include "an air conditioner exclusively for an air-cooling operation", "an air conditioner exclusively for an air-warming operation", "a refrigeration apparatus exclusively for a refrigeration operation", and "an air conditioner switchable to either an air-cooling operation or an air-warming operation by use of a four-way valve". The following description will be given, using "an air conditioner switchable to either an air-cooling operation or an air-warming operation by use of a four-way valve".

In FIG. 13, the air conditioner 101 includes an indoor unit 102 and an outdoor unit 103. The indoor unit 102 and the outdoor unit 103 are connected through a liquid refrigerant communicating pipe 104 and a gas refrigerant communicating pipe 105. As illustrated in FIG. 13, the air conditioner 101 is a pair type including the indoor unit 102 and the outdoor unit 103 that are provided one-to-one. However, the air conditioner 101 is not limited to this type, and may be a multi type including a plurality of indoor units 102.

In the air conditioner 101, devices such as an accumulator 115, a compressor 150, a four-way valve 116, an outdoor heat exchanger 117, an expansion valve 118, and an indoor heat exchanger 113 are connected through pipes, and constitute a refrigerant circuit 111.

In the present embodiment, the refrigerant circuit 111 is filled with a refrigerant for performing vapor compression-type refrigeration cycles. The refrigerant is a mixture refrigerant containing 1,2-difluoroethylene. The refrigerant circuit 111 is also filled with a refrigerator oil together with the mixture refrigerant.

The indoor heat exchanger 113 mounted in the indoor unit 102 is, for example, a cross fin-type fin-tube heat exchanger formed of a heat transfer tube and a plurality of heat transfer fins. A liquid side of the indoor heat exchanger 113 is connected to the liquid refrigerant communicating pipe 104, a gas side of the indoor heat exchanger 113 is connected to the gas refrigerant communicating pipe 105, and the indoor heat exchanger 113 functions as an evaporator of the refrigerant during a cooling operation.

The outdoor unit 103 is mounted with the accumulator 115, the compressor 150, the outdoor heat exchanger 117, and the expansion valve 118.

The outdoor heat exchanger 117 is, for example, a cross fin-type fin-tube heat exchanger formed of a heat transfer tube and a plurality of heat transfer fins. One side of the outdoor heat exchanger 117 is connected to a discharging pipe 124 through which a refrigerant discharged from the compressor 150 flows, and the other side of the outdoor heat exchanger 117 is connected to the liquid refrigerant communicating pipe 104. The outdoor heat exchanger 117 functions as a condenser of a gas refrigerant supplied from the compressor 150 through the discharging pipe 124.

The expansion valve 118 is provided on a pipe that connects the outdoor heat exchanger 117 and the liquid refrigerant communicating pipe 104. The expansion valve 118 is an electric-operated valve, of which the opening degree can be adjusted in order to adjust the pressure and the flow rate of the refrigerant flowing through the pipe.

The accumulator 115 is provided on a pipe that connects the gas refrigerant communicating pipe 105 and a suction pipe 123 of the compressor 150. The accumulator 115 is configured to separate the refrigerant that goes from the indoor heat exchanger 113 to the suction pipe 123 through the gas refrigerant communicating pipe 105 into a gas phase and a liquid phase in order to inhibit the liquid refrigerant from being supplied to the compressor 150. The gas-phase refrigerant that accumulates in an upper space of the accumulator 115 is supplied to the compressor 150.

<Four-way Valve 116>

The four-way valve 116 includes first to fourth ports. In the four-way valve 116, the first port is connected to the discharging side of the compressor 150, the second port is connected to the suction side of the compressor 150, the third port is connected to the gas-side end portion of the outdoor heat exchanger 117, and the fourth port is connected to a gas-side shut-off valve Vg.

The four-way valve 116 switches between a first state and a second state. When the four-way valve 116 is in the first state, the first port and the third port are connected, and the second port and the fourth port are connected. When the four-way valve 116 is in the second state, the first port and the fourth port are connected, and the second port and the third port are connected.

The compressor 150 is, for example, a scroll compressor. The compressor 150 includes a motor 170 controlled by a motor control apparatus 160, and a compression mechanism driven by the motor 170. The compressor 150 is configured to compress a refrigerant taken in through the suction pipe 123 in a compression chamber and discharge the refrigerant after being compressed from the discharging pipe 124 by being driven to rotate by the motor 170.

The motor control apparatus 160 is configured to control the motor 170 by using an alternating-current power supplied from an alternating-current power supply. The motor control apparatus 160 corresponds to, for example, the motor control apparatuses 1A and 1B according to the embodiments described above. The motor 170 corresponds to, for example, the motor 7 controlled by, for example, the motor control apparatuses 1A and 1B according to the embodiments described above, or to, for example, the motors 7A and 7B according to the embodiments described above. Accordingly, the air conditioner 101 including the compressor 150 mounted with the motor 170 is provided, wherein a harmonic component that occurs in a power input into the motor 170 and a harmonic component that occurs in an electromagnetic exciting force of the motor 170 can be reduced.

The refrigeration apparatus is not limited to the air conditioner, and may be, for example, oil cooling equipment.

Figure 14:
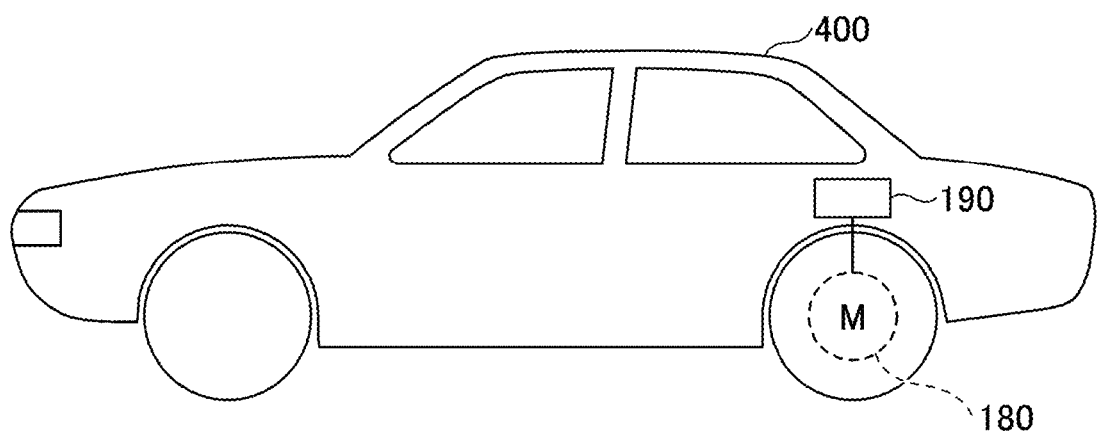
FIG. 14 is a view illustrating an example of a motor controlled by a motor control apparatus according to an embodiment or a vehicle mounted with a motor according to an embodiment.

FIG. 14 is a view illustrating an example of a motor controlled by a motor control apparatus according to an embodiment or a vehicle mounted with a motor according to an embodiment. A motor 180 is configured to transmit a driving force to a driving shaft configured to drive a driving wheel of a vehicle 400. The vehicle 400 may be an Electric Vehicle (EV) using only the motor 180 as a power source, or may be a Hybrid Vehicle (HV) or a Plug-in Hybrid Electric Vehicle (PHEV) using both the motor 180 and, for example, an internal combustion engine as driving sources.

The vehicle 400 includes a motor control apparatus 190, and a motor 180 controlled by the motor control apparatus 190. The illustrated mounting positions of the motor control apparatus 190 and the motor 180 are for expediency, and their mounting positions are not limited to the illustrated positions.

The motor control apparatus 190 is configured to control the motor 180 using a direct-current power supplied from a direct-current power supply such as a vehicle-mounted battery. The motor control apparatus 190 corresponds to, for example, the motor control apparatuses 1A and 1B according to the embodiments described above. The motor 180 corresponds to, for example, the motor 7 controlled by, for example, the motor control apparatuses 1A and 1B according to the embodiments described above, or to, for example, the motors 7A and 7B according to the embodiments described above. Accordingly, the vehicle 400 mounted with the motor 180 is provided, wherein a harmonic component that occurs in a power input into the motor 180 and a harmonic component that occurs in an electromagnetic exciting force of the motor 180 can be reduced.

Embodiments have been described above. However, it will be understood that various modifications are applicable to the embodiments and particulars without departing from the spirit and scope of the claims. Various modifications and improvements such as combination or replacement with parts or the whole of any other embodiment are possible.

This international application claims priority to Japanese Patent Application No. 2021-059252 filed Mar. 31, 2021. The entire contents of Japanese Patent Application No. 2021-059252 are incorporated herein by reference.

REFERENCE SIGNS LIST 1A,1B: motor control apparatus
4: inverter circuit
5,5A: control unit
6: alternating-current power supply
7,7A,7B: motor
8: reactor
20: compensating unit
101: air conditioner
111: refrigerant circuit
150: compressor
160,190: motor control apparatus
170,180: motor
400: vehicle

The invention claimed is:

1. A motor control apparatus configured to convert an input power supplied from a power supply to an output alternating-current power having a predetermined voltage and a predetermined frequency, the motor control apparatus comprising:
an inverter circuit configured to supply the output alternating-current power to a motor,
a memory, and
a processor coupled to the memory,
wherein the processor is configured to suppress an amplitude of a first harmonic component to be lower than or equal to a first predetermined value, the amplitude of a first harmonic component occurring synchronously with a rotation rate of the motor in a power input into the motor, and to suppress an amplitude of a second harmonic component to be lower than a second predetermined value, the amplitude of a second harmonic component occurring in an electromagnetic exciting force of the motor at a same frequency as the first harmonic component, the second predetermined value being the amplitude of the second harmonic component observed when the amplitude of the first harmonic component is suppressed to a minimum.

2. The motor control apparatus according to claim 1, wherein the power supply is an alternating-current power supply.

3. The motor control apparatus according to claim 1, wherein both the first harmonic component and the second harmonic component have a frequency that is 6 times a fundamental frequency of a voltage input into the motor.

4. The motor control apparatus according to claim 1, wherein the processor is configured to add compensation that dynamically aligns with the rotation rate of the motor to a motor control signal output from the processor to the inverter circuit.

5. The motor control apparatus according to claim 4, wherein the motor control signal includes at least one selected from a modulation rate of the inverter circuit, an amplitude of a voltage vector of a voltage input into the motor, a phase of the voltage vector, an amplitude of a current vector of a current input into the motor, and a phase of the current vector.

6. The motor control apparatus according to claim 4, wherein the processor is configured to detect a value correlating with the first harmonic component, and determine either or both of an amplitude and a phase of the compensation based on a relationship between the first harmonic component and the second harmonic component.

7. The motor control apparatus according to claim 6, wherein the memory is configured to store the relationship in a form of a table or a formula.

8. The motor control apparatus according to claim 4, wherein the processor is configured to detect a value correlating with the second harmonic component, and determine either or both of an amplitude and a phase of the compensation based on a relationship between the first harmonic component and the second harmonic component.

9. The motor control apparatus according to claim 4, wherein the processor is configured to detect a value correlating with the first harmonic component and a value correlating with the second harmonic value, and determine either or both of an amplitude and a phase of the compensation.

10. The motor control apparatus according to claim 4, wherein the processor is configured to determine either or both of an amplitude and a phase of the compensation based on a table or a formula that is stored in the memory.

11. The motor control apparatus according to claim 1, wherein the processor is configured to suppress both the amplitude of the first harmonic component and the second harmonic component such that a magnitude of variation of the first harmonic component is lower than a magnitude of variation of a component of the second harmonic component.

12. A motor configured to be controlled by a motor control apparatus comprising a memory and a processor coupled to the memory, the processor configured to suppress a first harmonic component that occurs synchronously with a rotation rate of the motor in a power input into the motor, or a second harmonic component that occurs in an electromagnetic exciting force of the motor at a same frequency as the first harmonic component,
wherein the motor has an inductance such that, upon the processor suppresses an amplitude of the first harmonic component, an amplitude of the second harmonic component becomes lower than a predetermined value, the predetermined value being the amplitude of the second harmonic component observed when the amplitude of the first harmonic component is suppressed to a minimum.

13. The motor according to claim 12, wherein the motor is a surface magnet synchronous motor including a rotor and a stator, and the rotor includes a rotor core and a plurality of magnets arranged in a circumferential direction of the rotor core.

14. The motor according to claim 12, wherein the motor is an interior magnet synchronous motor including a rotor and a stator, the rotor includes a rotor core and a plurality of magnets embedded in holes formed in the rotor core, and the rotor core includes a magnetic resistance portion provided to suppress a main magnetic flux of the magnets.

15. A compressor driven by a motor controlled by the motor control apparatus, wherein the motor control apparatus is configured to convert an input power supplied from a power supply to an output alternating-current power having a predetermined voltage and a predetermined frequency, the motor control apparatus comprising:

an inverter circuit configured to supply the output alternating-current power to the motor, a memory, and a processor coupled to the memory, wherein the processor is configured to suppress an amplitude of a first harmonic component to be lower than or equal to a first predetermined value, the amplitude of a first harmonic component occurring synchronously with a rotation rate of the motor in a power input into the motor, and to suppress an amplitude of a second harmonic component to be lower than a second predetermined value, the amplitude of a second harmonic component occurring in an electromagnetic exciting force of the motor at a same frequency as the first harmonic component, the second predetermined value being the amplitude of the second harmonic component observed when the amplitude of the first harmonic component is suppressed to a minimum.

* * * * *